US011909120B1

(12) United States Patent
Tianang et al.

(10) Patent No.: US 11,909,120 B1
(45) Date of Patent: Feb. 20, 2024

(54) MAGNETOELECTRIC ANTENNA ARRAY

(71) Applicant: Lockheed Martin Corporation, Bethesda, MD (US)

(72) Inventors: Elie Germain Tianang, Aurora, CO (US); James F. Mulvey, Castle Pines, CO (US); Andrew Jason Kee, Salt Lake City, UT (US); Erik Lier, Lakewood, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 17/952,913

(22) Filed: Sep. 26, 2022

(51) Int. Cl.
*H01Q 21/00* (2006.01)
*H01Q 21/06* (2006.01)
*H01Q 21/26* (2006.01)
*H01Q 21/08* (2006.01)

(52) U.S. Cl.
CPC ....... *H01Q 21/062* (2013.01); *H01Q 21/0025* (2013.01); *H01Q 21/0068* (2013.01); *H01Q 21/061* (2013.01); *H01Q 21/08* (2013.01); *H01Q 21/26* (2013.01)

(58) Field of Classification Search
CPC .. H01Q 21/062; H01Q 21/26; H01Q 21/0025; H01Q 1/246; H01Q 1/38; H01Q 21/065; H01Q 21/08; H01Q 21/061; H01Q 9/0485; H01Q 21/0068; H01Q 3/2617; H01Q 5/10
See application file for complete search history.

(56) References Cited

U.S. PATENT DOCUMENTS

| | | | | |
|---|---|---|---|---|
| 8,462,071 | B1 * | 6/2013 | Rudish | H01Q 21/26 343/810 |
| 9,735,475 | B2 * | 8/2017 | Anderson | H01Q 21/0006 |
| 10,320,085 | B1 * | 6/2019 | Lier | H01Q 19/10 |
| 10,651,566 | B2 * | 5/2020 | Adams | G01S 13/02 |
| 11,152,715 | B2 * | 10/2021 | Isom | H01Q 9/285 |
| 11,196,184 | B2 * | 12/2021 | Jordan | H01Q 21/0093 |
| 2020/0361635 | A1 * | 11/2020 | Braun | B64G 1/443 |

OTHER PUBLICATIONS

Li, Mingjian et al., "Wideband Magnetoelectric Dipole Antennas With Dual Polarization and Circular Polarization," IEEE Antennas and Propagation Magazine, vol. 57, No. 1, pp. 110-119, Feb. 2015.

* cited by examiner

*Primary Examiner* — Vibol Tan

(57) ABSTRACT

Provided herein are various magnetoelectric dipole antenna arrays and multi-array arrangements for handling radio frequency signals. In one example, an antenna array includes a baseplate conductively coupled to sets of plate elements by support members that position the plate elements at selected distances offset from a surface of the baseplate. Antenna probes are arranged in orthogonal pairs positioned within gaps between a corresponding set of plate elements, with each antenna probe comprising a conductive strip having a feed section coupled to a radio frequency connection through the baseplate, a transverse section generally parallel with the baseplate, and a terminal section directed back toward the baseplate. Dielectric structures for each pair of antenna probes comprise a dielectric material having channels that recess the conductive strips therein and a dielectric spacer positioned between overlapping transverse sections of the antenna probes.

20 Claims, 9 Drawing Sheets

MAGNETOELECTRIC ANTENNA ARRAY

TECHNICAL BACKGROUND

Various radio frequency antenna arrangements have been developed for microwave frequency applications, such as use on space-deployed craft for communications and ranging. Some example antenna arrangements include dipole, slot, helix, horn, Yagi, microstrip, and patch antennas, each with various limitations on packaging, bandwidth, cross-polarization, and radiation pattern directivity. Many emerging applications for microwave radio frequency (RF) transmissions include arrays of dozens or hundreds of antenna elements, useful for applications such as electronically-steerable arrays (ESAs), which establish packaging or sizing requirements that exclude certain antenna styles or types. Also, when deployed into vacuum environments, such as orbit or space, multipaction effects can limit power handling capabilities of many antenna types.

Magnetoelectric (ME) dipole antennas have been developed which include antenna arrangements having two F-shaped or U-shaped orthogonal probes surrounded by four conductive plates that are positioned above a ground plane situated in a box-style of reflector. The surfaces of the conductive plates in the ME dipole antenna act as ground planes, while energized probes transmit/receive RF signals by way of associated RF connectors. Portions of the probes located between gaps in the conductive plates couple the RF energy carried by the antenna. However, existing ME dipole antennas suffer from several limitations, including multipaction and structural fragility which make them unsuitable for most space-deployed applications.

Multipaction, or the multipactor effect, is a resonance effect for electrons in vacuum that can exist in response to RF fields accelerating electrons in the voids in waveguides or antenna devices which then impact the nearby surfaces. Under certain conditions, these accelerated electrons can liberate additional electrons from the impacted surfaces, leading to a runaway effect of an exponentially increasing quantity of electrons being accelerated and freed. Multipaction results in various operational degradations, such as high losses, signal distortions, and ultimately equipment failures, particularly in space-deployed devices.

OVERVIEW

Provided herein are various magnetoelectric (ME) dipole antenna arrays and multi-array arrangements for handling radio frequency signals. Array antennas based on legacy helix or patch antennas are not readily available with low profile, low mass, large bandwidth, high power handling, and dual polarization. Furthermore, when antenna arrays are deployed for space applications, multipaction effects can reduce performance and power handling of many legacy RF and antenna solutions, and any selected antenna needs sufficient ruggedization to survive launch and deployment processes. Passive intermodulation (PIM) is also a limiting factor for high power RF applications. The examples discussed herein include enhanced ME dipole arrays, which can be optimized to meet various performance goals. For example, the ME dipole arrays discussed herein can be ruggedized for space applications and have reduced multipaction, along with various optimizations for increased bandwidth, low axial ratio (cross-polarization), and low pattern group delay. When deployed in space applications, such as on radionavigation satellites, such ME dipole antennas can be a fraction of the protrusion profile of helix antennas, and half the weight of microstrip patch arrays.

In one example, a magnetoelectric antenna array includes a baseplate conductively coupled to sets of plate elements by support members that position the plate elements at selected distances offset from a surface of the baseplate. Antenna probes are arranged in orthogonal pairs positioned within gaps between a corresponding set of plate elements, with each antenna probe comprising a conductive strip having a feed section coupled to a radio frequency connection through the baseplate, a transverse section generally parallel with the baseplate, and a terminal section directed back toward the baseplate. Dielectric structures for each pair of antenna probes comprise a dielectric material having channels that recess the conductive strips therein and a dielectric spacer positioned between overlapping transverse sections of the antenna probes.

In another example, a magnetoelectric antenna arrangement includes a central antenna array surrounded by peripheral antenna arrays. Each among the central antenna array and the peripheral antenna arrays include a corresponding set of antenna structure instances. Each antenna structure instances can be as described above. For instance, an antenna instance includes a baseplate conductively coupled to a set of plate elements by support members that position the plate elements at selected distances offset from a surface of the baseplate. Antenna probes comprising conductive members are arranged in an orthogonal pair positioned within gaps between the plate elements. A support structure for the antenna probes includes a dielectric material having channels that recess the conductive members therein and a dielectric spacer positioned between overlapping transverse sections of the antenna probes.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Magnetoelectric (ME) dipole antenna arrays and multi-array arrangements for handling radio frequency signals are presented herein, which can be optimized to meet various performance goals, ruggedized for space applications, and have reduced multipaction effects when deployed into space. The ME dipole can achieve over 40% bandwidth, under 1 dB axial ratio and under ±1 cm group delay variation over the 3 dB pattern beamwidth. When deployed in space applications, such as on radionavigation satellites, these ME dipole antennas can be a fraction of the protrusion profile of helix antennas, and half the weight of microstrip patch arrays. Although not limited to satellite radionavigation systems, example suitable radionavigation systems include Global Positioning System (GPS), GLONASS, Galileo, or other global navigation satellite system (GNSS) or radionavigation-satellite service (RNSS) implementations.

The various ME dipole antennas discussed herein include arrangements having Γ-shaped or U-shaped antenna 'probes' or elements surrounded by conductive plates positioned above a baseplate. The surfaces of the conductive plates in the ME dipole antennas act as ground planes, along with the baseplate, while the antenna probes transmit/receive RF signals via associated RF connections fed through the baseplate. Portions of the antenna probes located between gaps in the conductive plates couple the RF energy carried by the antenna. The ME dipole antennas can be configured to exhibit wide impedance bandwidth, high input port isolation, stable gain, stable radiation patterns, low cross-polarization level, and low back radiation. Moreover, as mentioned above, the ME dipole antennas discussed herein overcome several limitations of other designs, providing for low multipaction and high structural ruggedness, especially when employed in space applications.

Figure 1:
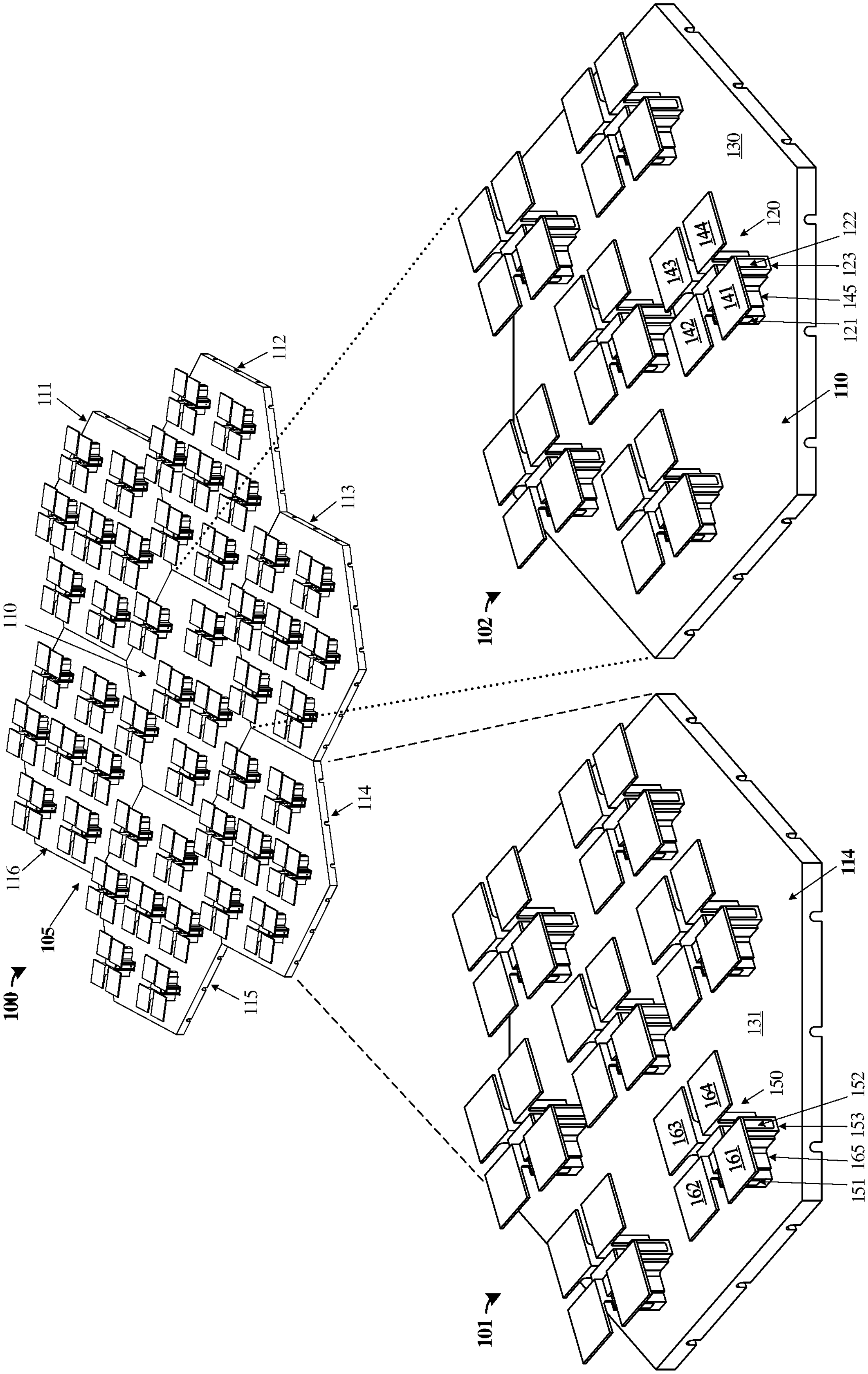
FIG. 1 illustrates a magnetoelectric antenna array in an implementation.

Turning to a first example implementation, FIG. 1 illustrates antenna system 105 having ME dipole antennas. FIG. 1 is a system diagram illustrating antenna system 105, as shown in views 100-102. View 100 provides an overview of antenna system 105, while views 101 and 102 include detailed views of different components of antenna system 105. Antenna system 105 includes an arrangement of various antenna assemblies, or sub-arrays, which are fit together into a larger antenna array. Specifically, antenna array 110 can comprise a main or central antenna array which is surrounded by several peripheral antenna arrays 111-116. Each among central antenna array 110 and peripheral antenna arrays 111-116 include a corresponding set of antenna structure instances formed by ME dipole antennas mounted to corresponding hexagonal baseplates. Although an abutted or interlocking hexagonal arrangement for each antenna assembly and for antenna system 105 is shown in FIG. 1, other shapes and coupling techniques can be employed. Example width dimensions for antenna system 105 for a 1-2 GHz frequency range include 114 centimeters (cm), or 45 inches, at the widest dimension spanning two peripheral antenna arrays and central antenna array 110. Actual dimensions will vary based on frequency range selected. Example heights or profiles include 1/10 the height of a comparable helix antenna system, and will vary based on implementation and selected heights for the antenna structure instances.

Turning now to detailed view 102, antenna array 110 comprises an antenna assembly and is shown having several antenna structures including exemplary antenna structure 120. Antenna structure 120 includes a set of plate elements 141-144 conductively coupled to baseplate 130 by support members (e.g., support member 145) that position plate elements 141-144 at individually selected distances offset from a surface of baseplate 130. Antenna probes 121-122 are arranged in orthogonal pairs positioned within gaps between this corresponding set of plate elements 141-144. Although partially hidden from view in FIG. 1, each antenna probe comprises a conductive strip having a feed section coupled to a radio frequency connection established through baseplate 130, a transverse section generally parallel with baseplate 130 and plate elements 141-144, and a terminal section directed back toward the baseplate 130. Dielectric structure 123 for antenna probes 121-122 is included, and comprises a structural dielectric material having channels that recess the conductive strips of antenna probes 121-122 therein. Dielectric structure 123 also includes a dielectric spacer (hidden from view) positioned between overlapping transverse sections of antenna probes 121-122.

View 101 shows a similar arrangement for antenna structure 150. Antenna structure 150 includes a set of plate elements 161-164 conductively coupled to a baseplate 131 by support members (e.g., support member 165) that positions plate elements 161-164 at selected distances offset from a surface of baseplate 131. Antenna probes 151-152 are arranged in orthogonal pairs positioned within gaps between this corresponding set of plate elements 161-164. Dielectric structure 153 for antenna probes 151-152 is included, and comprises a dielectric material having channels that recess the conductive strips of antenna probes 151-152 therein. Dielectric structure 153 also includes a dielectric spacer (hidden from view) positioned between overlapping transverse sections of antenna probes 151-152.

As seen in FIG. 1, central antenna array 110 comprises a hexagonal baseplate 130 with six (6) instances of antenna structures 120 mounted thereto. In contrast, peripheral antenna arrays 111-116 each comprise a hexagonal baseplate (e.g., baseplate 131) with seven (7) instances of antenna structure 150 mounted thereto. While antenna structure 120 and antenna structure 150 comprise similar elements, the exact configuration of each antenna structure instance can vary among the central and peripheral arrays, and within the individual arrays or assemblies. Antenna system 105 is coupled to further equipment and systems (not pictured), such as various RF circuitry, beamforming networks, power amplifiers, transmitters, receivers, transceivers, filters, and associated interconnect. Mounting features can be included on antenna arrays 110-116 to couple each to neighboring antenna arrays, to hold the antenna structures onto the baseplates, and to couple the baseplates to any associated chassis, device, vehicle, satellite, or other structure. Fasteners, alignment pins, quick disconnect couplers, adhesives, bonding agents, conductive couplers, or other elements can couple the baseplates to each other and to any underlying structure. Also, when deployed into environments with moisture, dust, or other environmental contaminants, a radome or other encasement can be included to protect antenna arrays 110-116 which permits transmission or receipt of RF signals while excluding the various environmental contaminants.

In operation, central antenna array 110 might be configured to handle a first type of RF communications, and peripheral antenna arrays 111-116 configured to handle a second, different, type of RF communications. Antenna system 105 can be deployed for use in any RF communications related to terrestrial, space, airborne, mobile, or stationary applications. However, in one example, central antenna array 110 might handle communications for a satellite radionavigation system, transmitting RF signaling towards Earth and surrounding orbits. For instance, central antenna array 110 can provide an Earth Coverage (EC) configuration for L1/L2/L5 GPS communications. Concurrently, peripheral antenna arrays 111-116 can carry other communications, such as broadband RF coverage using corresponding ESA subarrays. In further examples, both central antenna array 110 and peripheral antenna arrays 111-116 provide coverage in a satellite radionavigation system, with peripheral antenna arrays 111-116 augmenting the central antenna array 110 using beamforming or electronically steerable array techniques to handle additional coverage of receiving stations. Also, although various frequency ranges and targeted applications are discussed herein, it should be understood that the antenna structures and arrays can be adapted to any suitable RF frequency range, such as L-bands, ultrahigh frequency (UHF) bands, and microwave frequency bands.

Figure 2:
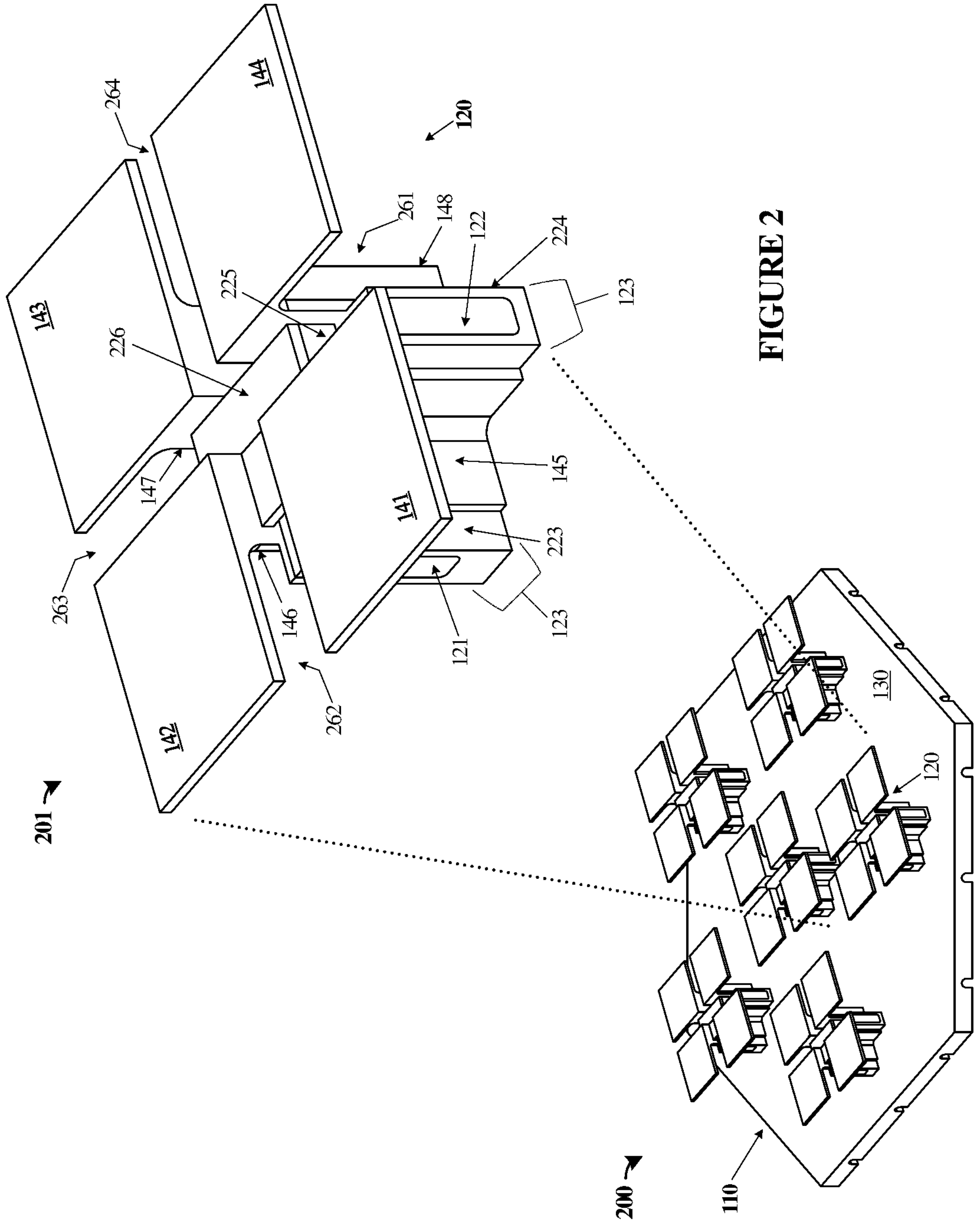
FIG. 2 illustrates a magnetoelectric antenna array in an implementation.

FIG. 2 includes views 200-201 illustrating additional details of antenna array 110 and antenna structure 120. View 200 shows a similar view of antenna structure 120 as seen in view 102 of FIG. 1, and such components are discussed above. View 201 illustrates a detailed view of antenna structure 120. Antenna structure 120 can be mounted to baseplate 130 and several instances or copies of antenna structure 120 can be mounted to form an array or assembly of antenna structures on baseplate 130. Other baseplate configurations can be employed, such as a different quantity of antenna structures or shape of baseplate. Moreover, antenna structure 120 might be employed separately, without any associated array or other antenna structures, and mounted on a differently sized baseplate.

Antenna structure 120 includes plate elements 141-144 conductively coupled to a baseplate 130 by corresponding support members 145-148. Each of support members 145-148 can have a different length, thus positioning plate elements 141-144 at individually selected distances from baseplate 130. A further discussion of this positioning is included in FIG. 6. Within gaps 261-264 established between plate elements 141-144 and support members 145-148, antenna probes 121-122 are positioned. Furthermore, dielectric support structure 123 is included into which antenna probes 121-122 are partially embedded. Support structure 123 includes dielectric members 223-224 and dielectric spacers 225-226. Antenna probes 121-122 are coupled to RF links, which can energize antenna probes 121-122 or be energized by antenna probes 121-122. These RF links are hidden in FIG. 2, but electrically couple to each of antenna probes 121-122 and pass through baseplate 130 for coupling via associated RF connectors. Typically, coaxial RF links and RF connectors are employed, which have associated characteristic impedances (e.g., 50 ohms).

Various materials and manufacturing techniques can be employed for baseplate 130, plate elements 141-144, and support members 145-148. Baseplate 130, plate elements 141-144, and support members 145-148 might be formed from a single workpiece, such as by machining or electrical discharge machining (EDM) from a block of material. Other examples include separate workpieces for each among plate elements 141-144, and support members 145-148. Alternatively, additive manufacturing techniques can be employed to form plate elements 141-144, and support members 145-148, such as 3D printing, molding, casting, or combinations thereof. Example materials include conductive materials or conductively-coated materials, such as aluminum, copper, or coated/plated polymers, including alloys and combinations of materials. Antenna probes 121-122 can be formed using similar techniques and materials, and are typically manufactured as separate workpieces from plate elements 141-144, and support members 145-148. Example dielectric materials and manufacturing techniques for support structure 123 are discussed below in FIGS. 3 and 4.

Figure 3:
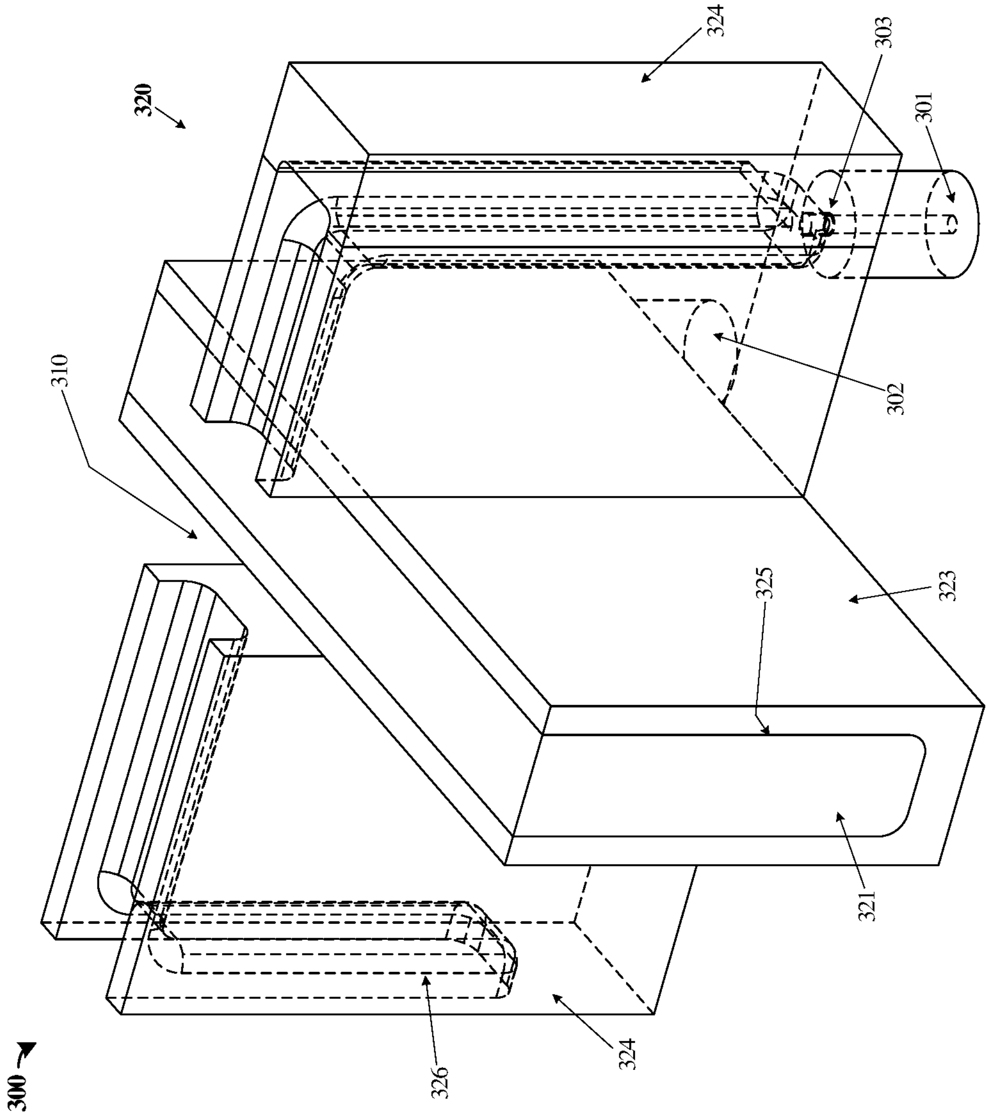
FIG. 3 illustrates a support structure for a magnetoelectric antenna in an implementation.

FIG. 3 illustrates support structure 320 for a magnetoelectric antenna in an implementation. Support structure 320 is an example implementation of support structure 123 from FIGS. 1-2, although variations are possible. Support structure 320 includes two main dielectric structures 323-324, one for each antenna probe. A first antenna probe 321 is included in FIG. 3, but a second antenna probe is omitted to show channel features more clearly. Dielectric structures 323-324 may be single workpiece structures, or be formed from two or more workpieces. Each dielectric structure 323-324 comprises a dielectric material having channels that recess conductive strips that form the antenna probes. For example, dielectric structure 324 is shown as having channel 326 which can accept a corresponding antenna probe. Dielectric structure 323 is shown having a similar channel 325, albeit hidden by antenna probe 321 mounted therein. As will be seen in FIG. 4, overlap region 310 can have one or more dielectric spacers inserted therein and positioned between overlapping transverse sections of the antenna probes. Also shown in FIG. 3 are coaxial connectors 301-302 which couple corresponding antenna probes to RF links. Each antenna probe includes a feed extension member (e.g. member 303) which conductively couples the antenna probe through a baseplate to the center conductor of the corresponding RF connector. The RF connectors typically comprise coaxial connectors and can be any suitable connector type or size based on the application. Example RF connector types include threaded, press-fit, bayonet, friction-fit, or other connector types able to be disconnected and reconnected. Example standardized coaxial connector styles include Threaded Neill—Concelman (TNC), Bayonet Neill—Concelman (BNC), and SMA (SubMiniature version A) connectors, among others.

Dielectric structures 323-324 provide structural support to the associated antenna probes, and thus comprise a material having structural or rigidity properties sufficient to meet the desired structural, vibrational, and shock environmental requirements. Dielectric structures 323-324 can be formed from various materials that act as a dielectric at least for the frequencies of concern for the corresponding antenna probes. Example dielectric foam materials can be employed include polymethacrylimide foam, melamine foam, polyurethane foam, ceramic foam, dielectric-coated metallic foams, carbon-impregnated or carbon-fiber foams, or other structural foams, including open or closed cell, reticulated or non-reticulated foam configurations. While non-conductive and non-attenuative foam (i.e. RF transparent to the associated transmission/reception frequencies) can be employed, some examples may employ RF-attenuative foam materials, such as carbon-impregnated, metal-impregnated, carbon fiber, dielectric coated metallic foams, or other suitable materials. However, regardless of the foam material, channels are formed into the foam material which can accept antenna probes. The antenna probes can be surface-recessed to be flush or at least partially embedded within the foam material. This configuration can reduce susceptibility of the antenna probes to vibration failure, increase structural rigidity of the combined antenna probe and dielectric arrangement, and reduce multipaction effects when deployed in space environments. Outgassing of dielectric materials can be taken into account to reduce or eliminate outgassing of the material components that form the foam when deployed into a vacuum or partial vacuum. In addition, durability to incident radiation, such as solar irradiance, can be considered in the material selection to reduce or prevent ultraviolet (UV) degradation of the material, among other considerations.

Formation of channels 325-326 within dielectric structures 323-324 can be achieved using various manufacturing techniques, and can vary based on the selected material. These include post-processing workpieces to machine out the channels, or various additive molding or printing techniques to form the channels concurrent with dielectric structures 323-324 themselves. The sizing of channels 325-326 can be selected to be a tight fit or interference fit with the corresponding antenna probes to ensure gaps are reduced or eliminated when the antenna probes are inserted into channels 325-326 during assembly. Holes for feed extension members (e.g., hole 328 in FIG. 4 for feed extension member 303), can be formed similarly, or may be formed using boring tools or drills. Thus, dielectric structures 323-324 comprise a foam material having the channels formed therein that recess conductive strips forming the antenna probes to be flush with a surface of the foam material, and have bores configured to route feed lines between RF connections/connectors and corresponding feed sections of the conductive strips.

Figure 4:
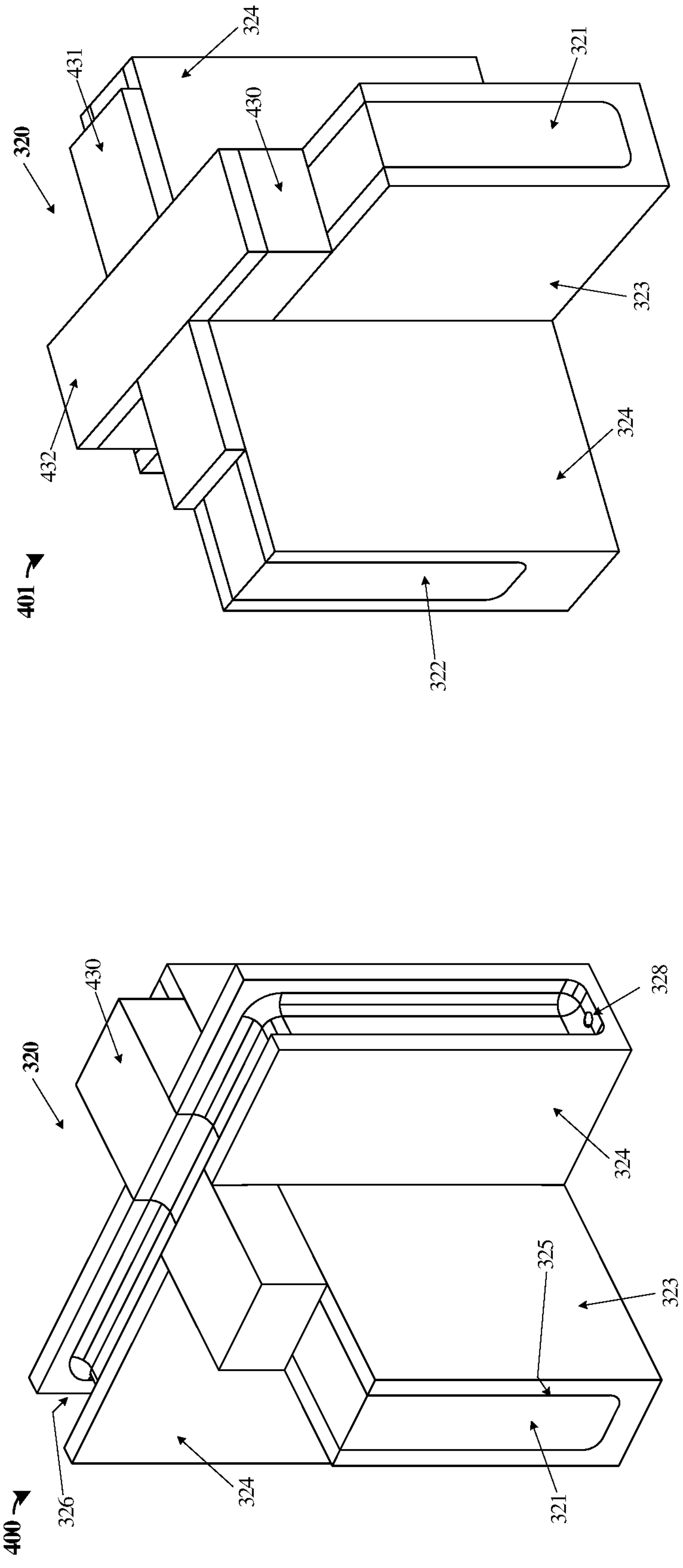
FIG. 4 illustrates a support structure for a magnetoelectric antenna in an implementation.

FIG. 4 illustrates further views 400-401 of support structure 320 for a magnetoelectric antenna in an implementation. FIG. 4 continues the discussion from FIG. 3, but includes further views to highlight different aspects of support structure 320. Specifically, view 400 includes dielectric spacer 430 which is positioned between antenna probe 321 and to-be-inserted antenna probe 322. View 401 includes dielectric spacers 431-432 which are positioned on top of antenna probe 322. Dielectric spacers 430-432 can be of a similar material discussed above for dielectric structures 323-324, or may vary. For example, dielectric spacers 430-432 can comprise a high-K dielectric material configured to reduce multipaction between the antenna probes and between the antenna probes and adjacent portions of plate elements (e.g., plate elements 141-144). Dielectric spacers 431-432 can reduce multipaction effects among parallel structures of antenna probes 321-322 and surrounding plate elements. Thus, dielectric spacer 430 can reduce multipaction effects among overlapping transverse portions of the antenna probes. Additionally, dielectric structures 323-324, while providing structural support and rigidity to antenna probes, can also reduce multipaction effects for antenna probes 321-322 and surrounding plate elements, support members, and baseplates, as well as RF connectors with respect to associated antenna probes. In general, multipaction effects can be reduced by avoiding parallel surfaces. When parallel surfaces cannot be avoided entirely, then the various dielectric materials included herein can further act to reduce or eliminate multipaction effects.

Figure 5:
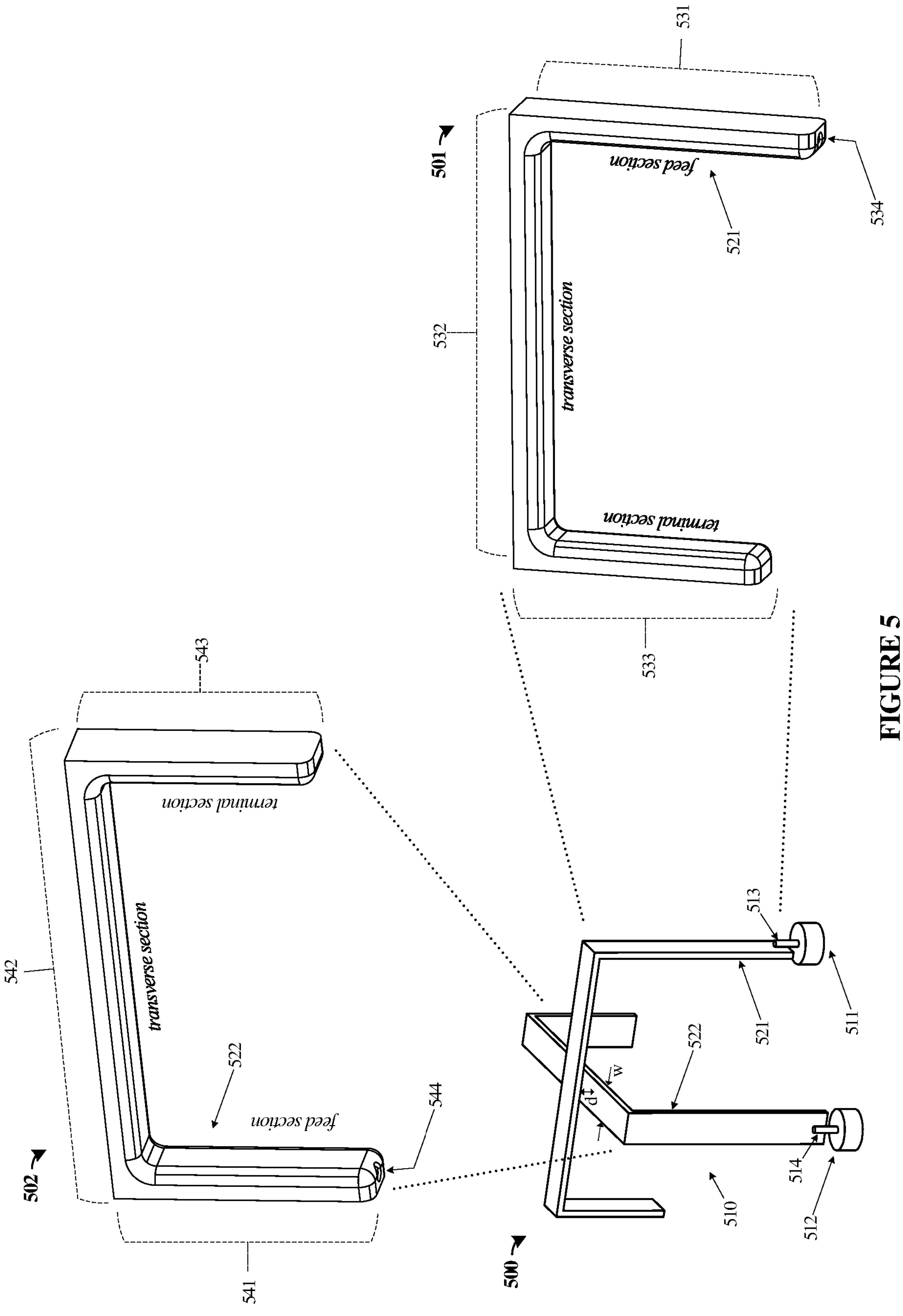
FIG. 5 illustrates antenna probes for a magnetoelectric antenna in an implementation.

FIG. 5 illustrates antenna probes for a magnetoelectric antenna in an implementation. Antenna probes 521-522 are illustrated in views 500-502, which can be example implementations of antenna probes 121-122 in FIG. 1 or antenna probes 321-322 in FIG. 3. View 500 shows a typical installation configuration for antenna probes 521-522, such as in an antenna array or antenna structure, but in a less ruggedized configuration with dielectric structures and supports omitted in view 500 for clarity and to schematically show interrelationships among antenna elements. Thus, view 500 shows antenna probes 521-522 in a simplified or schematic view, in contrast with views 501-502 which show more ruggedized versions of antenna probes 521-522. View 501 illustrates an isolated antenna probe 521, while view 502 illustrates an isolated antenna probe 522. View 500 also includes feed extension members 513-514 which couple the conductive strip sections of antenna probes 521-522 to center conductors of coaxial connectors 511-512.

Beginning with view 500, antenna configuration 510 includes antenna probes 521-522 comprising Γ-shaped conductive strips having three corresponding linear sections each having a corresponding width (w). Each antenna probe has a first section, referred to as a feed section or feed portion herein, and shown as elements 531 and 541 in FIG. 5. These feed sections are coupled on a first longitudinal end to corresponding feed extension members 513-514 at feed points 534 and 544. The feed sections are coupled on a second longitudinal end to second sections, referred to as transverse sections or transverse portions herein, and shown as elements 532 and 542 in FIG. 5. A portion of transverse sections 532 and 542 overlap in view 500 and are spaced or gapped by distance as shown. The transverse sections are then coupled on longitudinal ends to third sections, referred to as a terminal section or terminal portion herein, and shown as elements 534 and 544 in FIG. 5. The terminal sections terminate each antenna probe.

Thus, antenna probes 521-522 can be arranged in pairs (and positioned within gaps between a corresponding set of plate elements), with each antenna probe comprising a convex filleted or rounded-over conductive strip having a feed section coupled to a radio frequency connection (typically through a baseplate), a transverse section generally parallel with the baseplate, and a terminal section directed back toward the baseplate. This configuration or arrangement provides for an orthogonal relationship between pairs of antenna probes. Antenna probes 521-522 can be mounted or embedded into corresponding dielectric structures, as discussed herein. At one end of each of antenna probes 521-522, RF connectors 511-512 and feed extension members 513-514 are included to conductively couple to the main body/member of each antenna probe. RF connectors 511-512 couple to coaxial RF links which can further couple to various beamforming network apparatuses, RF circuitry, amplifiers, filters, and other various RF elements of an antenna array. Example RF coaxial connector types includes TNC, BNC, and SMA connectors, among others.

Figure 6:
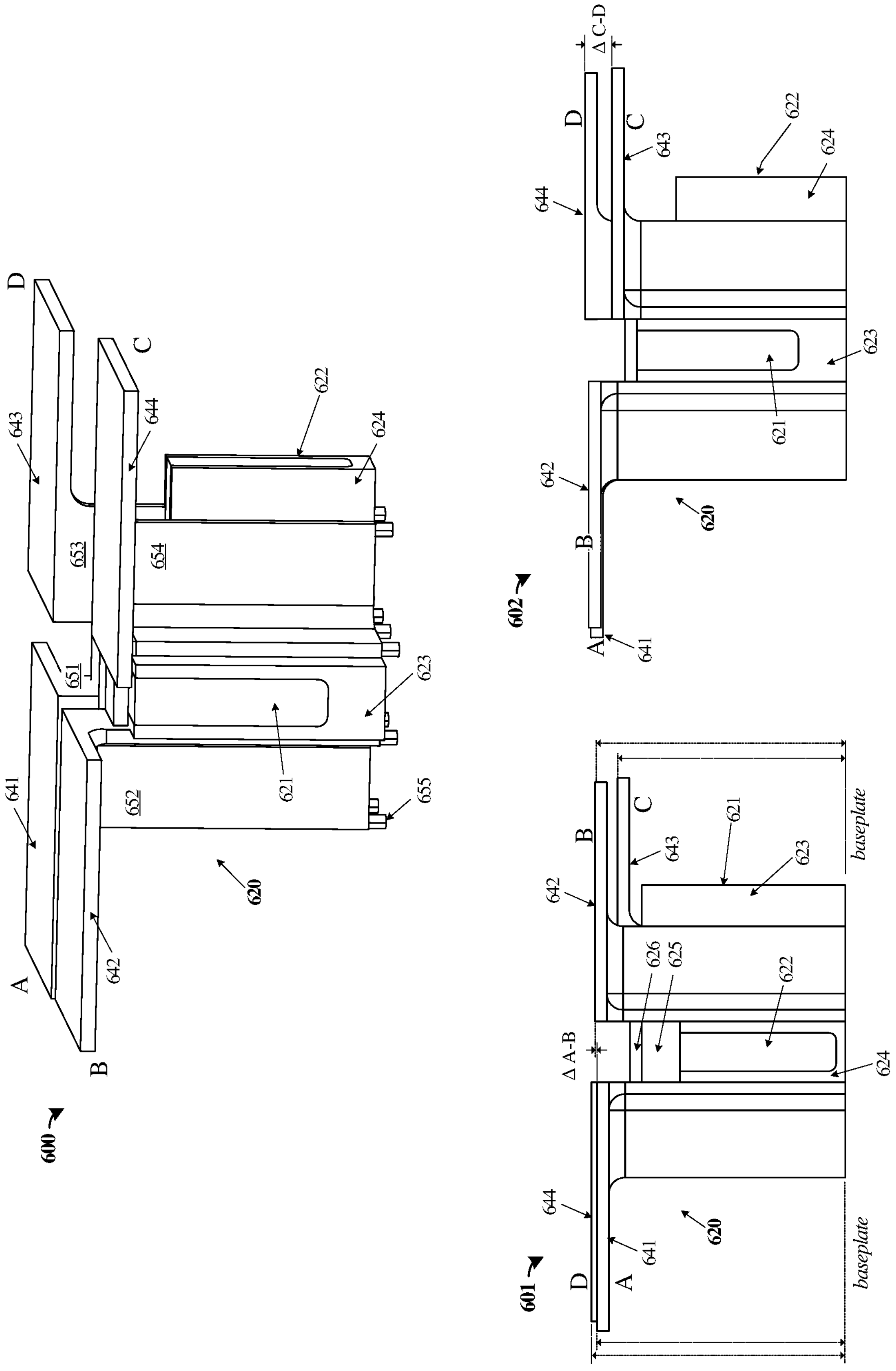
FIG. 6 illustrates a magnetoelectric antenna in an implementation.

FIG. 6 illustrates magnetoelectric antenna 620 in an implementation. View 600 is provided to highlight spatial relationships among antenna probes, dielectric structures, conductive plates, and conductive plate support members. Views 601-602 show the use of different height offsets of various conductive plates. Different height offsets are achieved by mounting conductive plates 641-644 with correspondingly-sized support members 651-654 which offset conductive plates from a baseplate. The baseplate, not shown in FIG. 6, acts as a ground plane for antenna 620, along with conductive plates 641-644 held by support members 651-654 conductively coupled to the baseplate. While conductive plates 641-644 and support members 651-654 might be formed from separate workpieces, combined workpieces or single workpieces can be achieved using various manufacturing techniques, such as additive manufacturing (e.g., casting, molding, or 3D printing), or subtractive manufacturing (e.g., traditional machining or EDM). Mounting stubs 655 can be included on support members 651-654 to provide for mounting to the associated baseplate, such as by fasteners, welds, adhesives, and the like.

View 601 shows offset heights with respect to top sides of conductive plates 641-644, with each conductive plate further labeled with A, B, C, and D to aid in identification across the various rotated views. In view 601, a difference or delta between plates A-B are highlighted, and in view 602 a difference or delta between plates C-D are highlighted. Support members 651-654 individually establish these selected heights or distances offset from the surface of the corresponding baseplate to achieve performance targets or optimizations for various parameters. These parameters include axial ratio (target 1 dB), bandwidth (target 45%), pattern group delay variation (target ±1 cm over the 3 dB beamwidth), return loss (target 15 dB) and insertion losses (target 0.5 dB). Low pattern group delay for an antenna and an array of antennas can be achieved by altering the offsets noted for antenna 620 and companion antennas deployed in an array. The reduction in multipaction leads to higher power handling, such as over 1500 Watts for L-band communications in a compact form factor. Additionally, length adjustments for feed extension elements can be provided that couple between antenna probes and RF connectors, as will be discussed in FIGS. 7-8.

Figure 7:
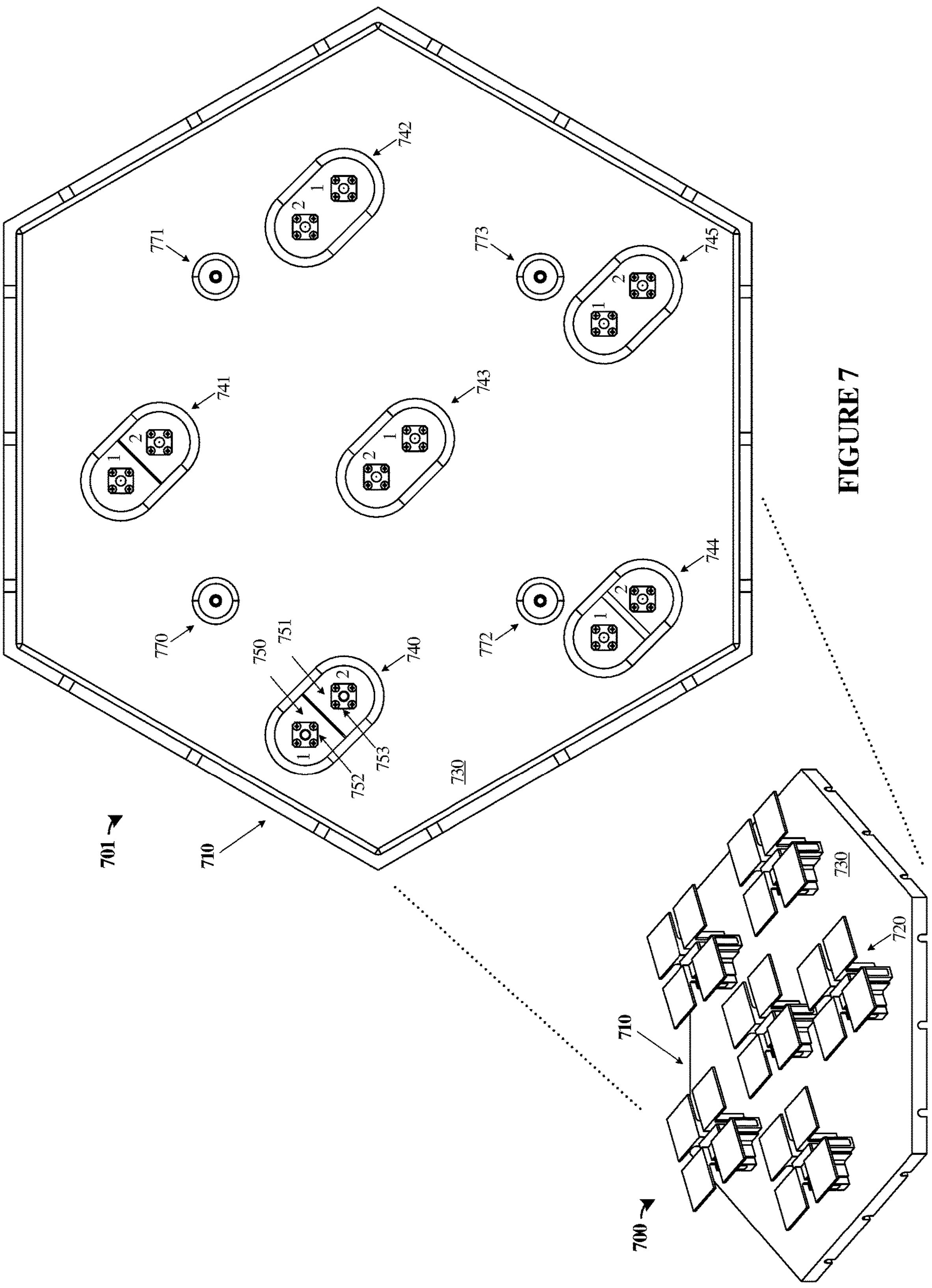
FIG. 7 illustrates a magnetoelectric antenna array assembly in an implementation.

FIG. 7 illustrates magnetoelectric antenna array assembly 710 in an implementation. View 700 shows an overview of assembly 710 which includes six (6) instances of magnetoelectric antenna structures, with one such magnetoelectric antenna structure labeled as antenna structure 720. The antenna structures are mounted to a front or top surface of baseplate 730, and RF connections are achieved from a back or bottom surface of baseplate 730 using various RF connectors and feed extension members. View 701 highlights riser structures 740-745 on a back surface of baseplate 730, to which connectors are mounted and RF links can be coupled. Riser structure 740 includes two RF connectors, namely RF connectors 752-753, each located on a corresponding portion or half 750-751 of riser structure 740. Additionally, several baseplate mounting features are included (e.g., elements 770-773) comprising mounting holes through which fasteners can be fitted to secure baseplate 730 to a substructure, chassis, satellite, or vehicle. Although not shown in FIG. 7, sides of baseplate 730 can include baseplate-to-baseplate mounting features, such as flanges with holes or slots, which can be employed to mount more than one baseplate together to form an array or larger assembly (see FIG. 1).

Riser structures 740-745 can be formed from the same workpiece as baseplate 730, such as machined or additively manufactured from the same workpiece. As noted above, each of riser structures 740-745 includes two portions or halves that include a corresponding RF connector. Each half of each riser structure includes a single RF connector which feeds a corresponding antenna probe on the opposing side of baseplate 730. Moreover, each half of each riser structure can have a unique thickness or height from the surface of baseplate 730. These thicknesses can establish different pathlengths of RF connections between the RF connectors and the antenna probes, providing for slight differences in propagation delays for each antenna probe feed. The differences in propagation delays establish desired performance characteristics or parameters for the corresponding antenna structures, such as axial ratio (target 1 dB), bandwidth (target 45%), pattern group delay variation (target ±1 cm over the 3 dB beamwidth), return loss (target 15 dB) and insertion losses (target 0.5 dB). When deployed into a large array of antenna structures and baseplates, individual riser structure thicknesses can establish desired flatness or skew to RF propagation patterns, or tuning to selected phase delays among each antenna probe or antenna structure, among other performance characteristics.

Additionally, while each riser structure couples to the two antenna probes of a single antenna structure instance, adjacent or proximate riser structures on baseplate 730 can have an interleaved orientation to flip or have adjacently rotated connection orientations among the riser structures and corresponding antenna probes. One example connection orientation is to have adjacent orthogonal pairs of the antenna probes for each antenna structure have antisymmetric connection orientations with respect to the baseplate. This configuration of interleaving of probe elements can be provided to equalize H and V polarization components for the antenna as a whole. View 701 shows an example with first antenna probes of each antenna structure labeled with a '1' and second antenna probes of each antenna structure labeled with a '2'. Thus, the corresponding antenna structures and probes would be rotated or flipped in the horizontal plane (with respect to baseplate 730) to provide for these selected connection orientations. This provides an interleaving of H and V polarization components among the antenna probes.

Figure 8:
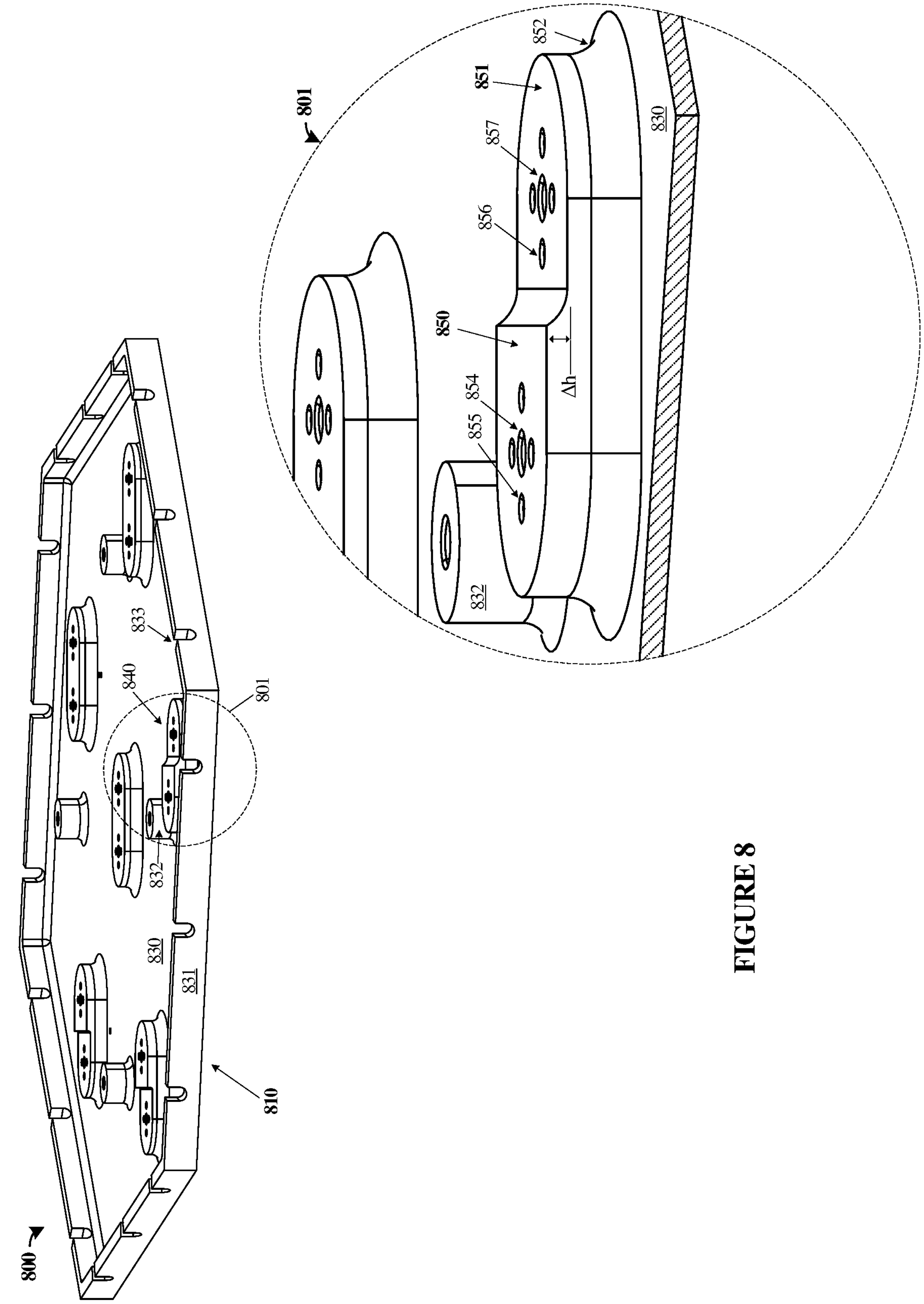
FIG. 8 illustrates a magnetoelectric antenna array assembly in an implementation.

FIG. 8 illustrates magnetoelectric antenna array assembly 810 in an implementation. Similar features are included in FIG. 7, although variations are possible. View 800 shows an underside of baseplate 830 forming assembly 810 which includes six (6) instances of riser structures for corresponding antenna structures (mounted to the opposing side of baseplate 830). Assembly 810 also includes baseplate mounting features, such as mounting element 832 configured to mount baseplate 830 to a sub-structure, and side flange or skirt 831 having mounting slots 833 configured to mount baseplate 830 to other baseplates in an array.

FIG. 8 includes detailed inset view 801 which highlights one example riser structure 840. Riser structure 840 comprises a portion of material rising above a surface of baseplate 830 having tapers, fillets, or chamfers (852) leading to a vertical rise and terminated in two flat portions 850-851. Other riser structures on baseplate 830 can have similar features as shown for riser structure 840, although each riser structure might have different rise heights or multiple rise heights for each half-portion. Portion 850 includes RF connector mounting features 855 which can accept fasteners from a corresponding RF connector, and includes center conductor pass-through 854. Center conductor pass-through 854 provides for routing of a coaxial center conductor through baseplate 830 to a corresponding antenna probe, which might be interconnected via an extension member. As the RF connectors herein typically comprise coaxial connectors, the shield or outer conductors will be conductively coupled to baseplate 830, and the center conductors will feed to corresponding antenna probes. Similarly, portion 851 includes RF connector mounting features 856 and center conductor pass-through 857.

As can be seen in FIG. 8, different heights or thicknesses have been established between portions 850 and 851, noted by $\Delta h$. Each riser structure on baseplate 830 might have a different height for each portion, tuned according to the application and needs of the antenna array. These thicknesses can establish different pathlengths of RF connections between the RF connectors and the antenna probes, providing for slight differences in propagation delays for each antenna probe feed. The differences in propagation delays establish desired performance characteristics or parameters for the corresponding antenna structures, such as axial ratio, group delay, bandwidth, and transmission losses. When deployed into a large array of antenna structures and baseplates, individual riser structure thicknesses can establish desired flatness or skew to RF propagation patterns, or tuning to selected phase delays among each antenna probe or antenna structure, among other performance characteristics.

Figure 9:
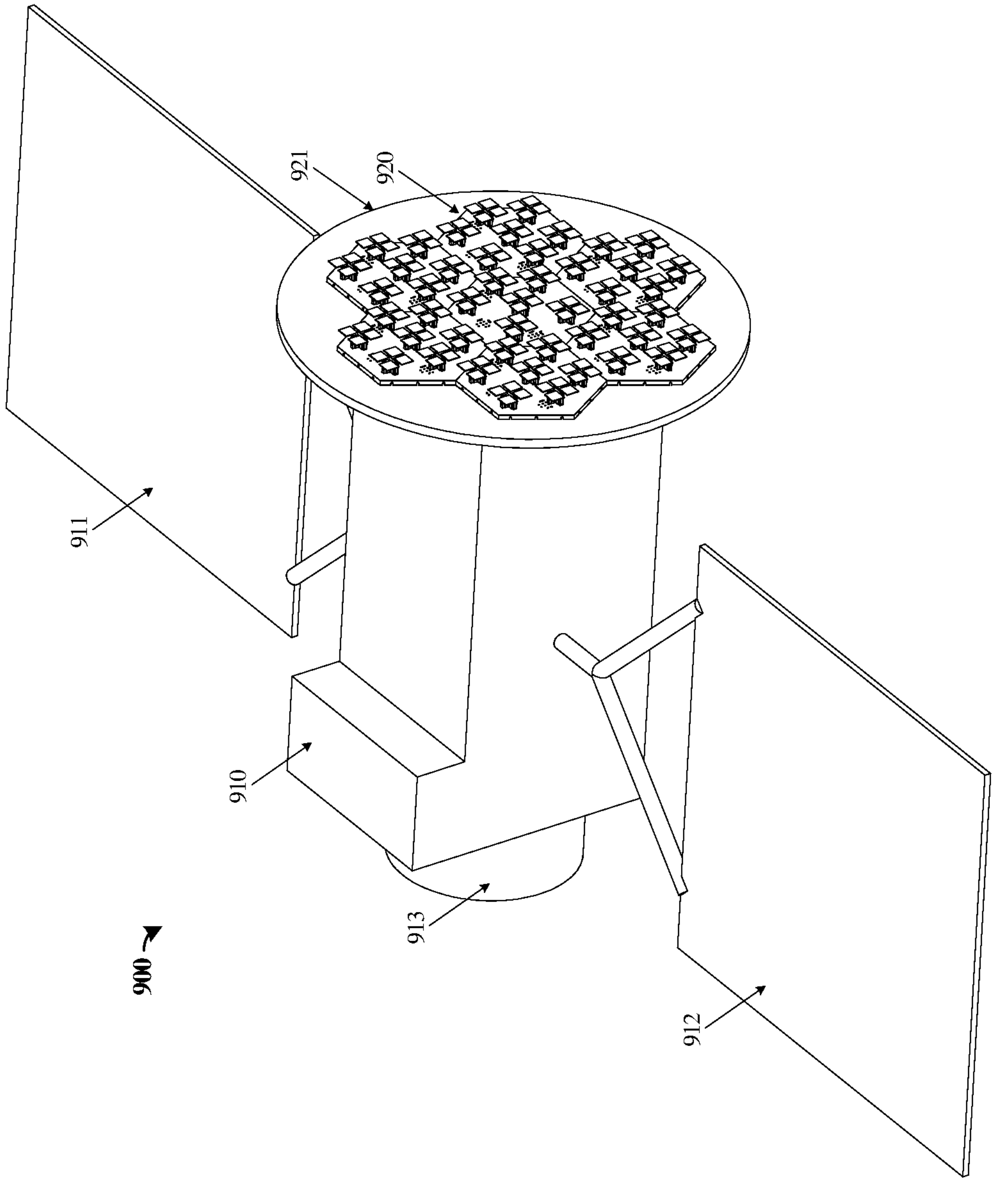
FIG. 9 illustrates a satellite that includes a magnetoelectric antenna array in an implementation.

FIG. 9 illustrates satellite 900 that includes a magneto-electric antenna assembly in an implementation. Satellite 900 includes chassis or bus 910, solar arrays 911-912, propulsion or station-keeping features 913, and antenna system 920. Antenna system 920 can be an example implementation of antenna system 105 from FIG. 1, and may include any of the antenna assembly elements discussed herein in any of the Figures. Antenna system 920 is mounted to antenna mounting plate 921, and includes a central antenna array surrounded by peripheral antenna arrays (see FIG. 1 for details). Each among the central antenna array and the peripheral antenna arrays include a corresponding set of antenna structure instances. Each antenna structure instance comprises sets of plate elements conductively coupled to a baseplate by support members that position the plate elements at selected distances offset from surfaces of the baseplate. Antenna probes are arranged in orthogonal pairs positioned within gaps between a corresponding set of plate elements, and each antenna probe comprises a conductive strip having a feed section coupled to a radio frequency connection through the baseplate, a transverse section generally parallel with the baseplate, and a terminal section directed back toward the baseplate. Dielectric structures for each pair of antenna probes are included, with each dielectric structure comprising a dielectric material having channels that recess the conductive strips therein and a dielectric spacer positioned between overlapping transverse sections of the antenna probes.

Satellite 900 can be deployed from a launch vehicle into a selected orbit or trajectory, and can be powered by photovoltaic solar arrays 911-912 or on-board power elements. Bus 910 houses and acts as a chassis and power distribution system for satellite 900, and can include thermal regulation elements, as well as propulsion/station-keeping 913 which positions and orients satellite 900. Communication systems are included on satellite 900 to interface with antenna instances on antenna system 920, and to transmit or receive signals with respect to distant nodes. As mentioned herein, satellite 900 might be deployed to provide a portion of a GPS system or other communication system. A central antenna array or assembly is surrounded by a set of peripheral antenna arrays or assemblies.

Advantageously, a satellite or other device having antenna system 920 provides for a low-profile, low mass, large bandwidth, and high power handling antenna arrangement with dual polarization from each pair of antenna probes. For space applications, such as that of satellite 900, multipaction limits many RF and antenna solutions, and passive intermodulation (PIM) is also a limiting factor for any high power applications. Antenna system 920 overcomes these limitations using the dielectric support structures and associated features discussed herein. Moreover, antenna system 920 can be ruggedized to survive launch into a selected orbit or trajectory, as the dielectric supports provide a dual function of structural support and multipaction reduction.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An antenna array, comprising:

a baseplate conductively coupled to sets of plate elements by support members that position the plate elements at selected distances offset from a surface of the baseplate;

antenna probes arranged in orthogonal pairs positioned within gaps between a corresponding set of plate elements, each antenna probe comprising a conductive strip having a feed section coupled to a radio frequency connection through the baseplate, a transverse section generally parallel with the baseplate, and a terminal section directed back toward the baseplate; and dielectric structures for each pair of antenna probes, each dielectric structure comprising a dielectric material having channels that recess the conductive strips therein and a dielectric spacer positioned between overlapping transverse sections of the antenna probes.

2. The antenna array of claim 1, wherein the support members individually establish the selected distances offset from the surface of the baseplate of the plate elements to achieve performance targets for at least one among axial ratio, bandwidth, group delay, and transmission losses.

3. The antenna array of claim 1, wherein the dielectric material comprises a foam material having the channels formed therein that recess the conductive strips of the antenna probes flush with a surface of the foam material, and having bores configured to route feed lines between the radio frequency connections and corresponding feed sections of the conductive strips.

4. The antenna array of claim 1, wherein the dielectric spacer comprises a high-K dielectric material configured to reduce multipaction between the antenna probes.

5. The antenna array of claim 1, wherein adjacent orthogonal pairs of the antenna probes have antisymmetric connection orientations with respect to the baseplate.

6. The antenna array of claim 1, comprising:

riser structures on a back surface of the baseplate that provide individual pathlengths among the radio frequency connections through the baseplate and establish selected phase relationships among the antenna probes.

7. An antenna arrangement, comprising:

a central antenna array surrounded by peripheral antenna arrays;

wherein each among the central antenna array and the peripheral antenna arrays include a corresponding set of antenna structure instances, each antenna structure instance comprising:

sets of plate elements conductively coupled to a baseplate by support members that position the plate elements at selected distances offset from surfaces of the baseplate;

antenna probes arranged in orthogonal pairs positioned within gaps between a corresponding set of plate elements, each antenna probe comprising a conductive strip having a feed section coupled to a radio frequency connection through the baseplate, a transverse section generally parallel with the baseplate, and a terminal section directed back toward the baseplate; and dielectric structures for each pair of antenna probes, each dielectric structure comprising a dielectric material having channels that recess the conductive strips therein and a dielectric spacer positioned between overlapping transverse sections of the antenna probes.

8. The antenna arrangement of claim 7, wherein each among the central antenna array and the peripheral antenna arrays comprise separate hexagonal shaped baseplates abutted at corresponding edges to form the antenna arrangement.

9. The antenna arrangement of claim 7, wherein the central antenna array comprises six antenna structure instances; and wherein the peripheral antenna arrays each comprise seven antenna structure instances.

10. The antenna arrangement of claim 7, wherein the central antenna array is configured to handle higher power transmissions than the peripheral antenna arrays, and comprises an antenna array for a radionavigation system; and wherein the peripheral antenna arrays each comprise extended coverage electronically steerable arrays (ESAs).

11. The antenna arrangement of claim 7, wherein, for each antenna structure instance, the support members individually establish the selected distances offset from the surface of the baseplate of the plate elements to achieve performance targets for at least one among axial ratio, bandwidth, group delay, and transmission losses.

12. The antenna arrangement of claim 7, wherein, for each antenna structure instance, the dielectric material comprises a foam material having the channels formed therein that recess the conductive strips of the antenna probes flush with a surface of the foam material, and having bores configured to route feed lines between the radio frequency connections and corresponding feed sections of the conductive strips.

13. The antenna arrangement of claim 7, wherein, for each antenna structure instance, the dielectric spacer comprises a high-κ dielectric material configured to reduce multipaction between the antenna probes.

14. The antenna arrangement of claim 7, comprising:

riser structures on a back surface of the baseplates for each antenna structure instance that provide individual pathlengths among the radio frequency connections through the baseplate and establish selected phase relationships among the antenna probes.

15. An antenna, comprising:

a set of plate elements conductively coupled to a baseplate by support members that position the plate elements at selected distances offset from a surface of the baseplate;

antenna probes comprising conductive members arranged in an orthogonal pair positioned within gaps between the plate elements; and a support structure for the antenna probes, each support structure comprising a dielectric material having channels that recess the conductive members therein and a dielectric spacer positioned between overlapping transverse sections of the antenna probes.

16. The antenna of claim 15, wherein each conductive member comprises a feed section coupled to a radio frequency connection through the baseplate, a transverse section generally planar with the set of plate elements, and a terminal section directed back toward the baseplate.

17. The antenna of claim 15, wherein the support members individually establish the selected distances offset from the surface of the baseplate of the plate elements to achieve performance targets for at least one among axial ratio, bandwidth, group delay, and transmission losses.

18. The antenna of claim 15, wherein the dielectric material comprises a foam material having the channels formed therein that recess the conductive members of the antenna probes flush with a surface of the foam material.

19. The antenna of claim 15, wherein the antenna probes and the set of plate elements are sized to support radio frequency transmission bands of at least one among L-band, ultrahigh frequency (UHF) band, and microwave frequency band.

20. The antenna of claim 15, comprising:

riser structures on a back surface of the baseplate that provide individual pathlengths among radio frequency connections through the baseplate and establish selected phase relationships among the antenna probes.

* * * * *